United States Patent Office 3,415,794
Patented Dec. 10, 1968

3,415,794
POLYMERS CONTAINING OXETANE GROUPS
Hans Orth, Binningen, Paul Zuppinger, Arlesheim, Hans Gempeler, Muttenz, and Paul Schaefer, Riehen, Switzerland, assignors to Ciba Limited, Basel, Switzerland
No Drawing. Filed Mar. 28, 1966, Ser. No. 544,338
Claims priority, application Switzerland, Apr. 1, 1965, 4,504/65
12 Claims. (Cl. 260—78.5)

The subject of the present invention is new, essentially straight chain polymers which contain, arranged along the polymer chain, units of structural formula

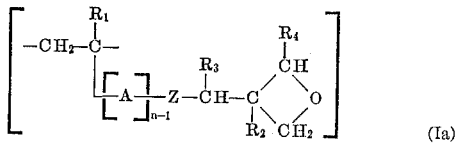
(Ia)

in which $R_1$ denotes a hydrogen atom or a lower alkyl residue of 1 to 4 carbon atoms, $R_2$ denotes a lower alkyl residue of 1 to 4 carbon atoms, $R_3$ and $R_4$ each represent a hydrogen atom or the methyl group, Z represents an oxygen atom or a sulphur atom and A denotes a bivalent aliphatic, cycloaliphatic, araliphatic or aromatic hydrocarbon residue, and $n$ represents the number 1 or 2.

According to the invention, the new polymers may be produced by polymerising (a) ethylenically unsaturated ethers or thioethers containing oxetane groups, of formula

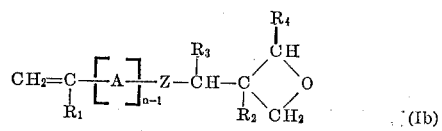
(Ib)

in which $R_1$, $R_2$, $R_3$, $R_4$, Z and $n$ have the same significance as in Formula Ia, optionally together with (b) other copolymerisable ethylenically unsaturated monomeric compounds.

A preferred subdivision of starting momomers (a) of Formula Ib are vinyl ethers of formula

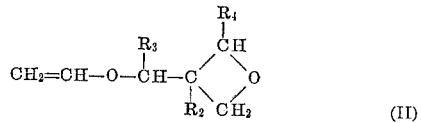
(II)

in which the residues $R_2$, $R_3$ and $R_4$ have the same significance as in Formula Ia.

The monomeric oxetane ethers of Formula II are new compounds.

Again, the [(3-ethyl-1-oxacyclobutyl-3)-methyl]-vinyl ether of formula

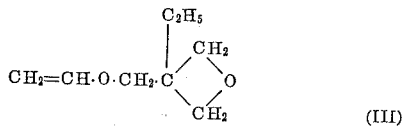
(III)

is distinguished by being particularly easily obtainable.

In order to produce the new monomers of Formula III it is for example possible to trans-vinylate 3-hydroxymethyl-3-ethyl-1-oxacyclobutane by means of vinyl acetate in the presence of mercury acetate or mercury sulphate as the catalyst, according to the following equation:

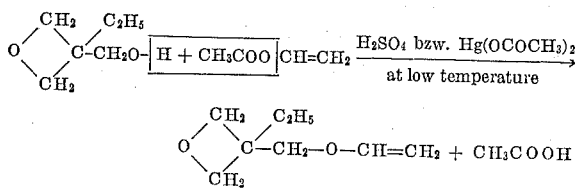

However, it is also possible to carry out the vinylation of the 3-hydroxymethyl-3-ethyl-1-oxacyclobutane by the method of W. Reppe, namely by the addition of acetylene to the hydroxyl group in the presence of alkali.

A further preferred subdivision of starting monomers (a) of Formula Ib are vinylbenzyl ethers or α-alkylsubstituted vinylbenzyl ethers of formula

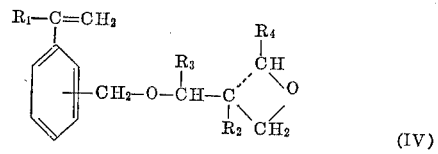
(IV)

in which the residues $R_1$, $R_2$, $R_3$ and $R_4$ have the same significance as in Formula Ia.

The monomeric oxetane ethers of Formula IV are also new compounds.

Again, particularly easy accessibility is a characteristic of the (3-ethyl-1-oxacyclobutyl-3)-methyl-(2′ or 3′ or 4′-vinylbenzyl) ethers of formula

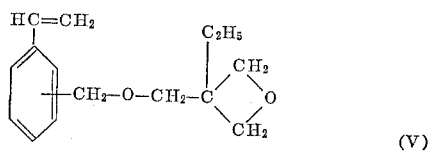
(V)

in which the (3-ethyl-1-oxacyclobutyloxy) methyl group may be bonded in the ortho-, meta- or para-position to the vinyl group, or mixtures of the said isomers.

In order to produce the new monomers of Formula V one preferably condenses 3-hydroxymethyl-3-ethyl-1-oxacyclobutane with o- or p-(β-chlorethyl)-benzyl chloride or with m- or p-vinyl-benzyl chloride in the presence of strong alkali. When the β-chlorethyl-benzyl chloride is used, the chlorethyl group is simultaneously dehydrochlorinated to the vinyl group by the strong alkali.

The β-chlorethyl-benzyl chloride or vinylbenzyl chloride may in turn be produced in a manner which is in itself known, for example by chloromethylation of β-chlorethylbenzene by means of formaldehyde and hydrochloric acid in the presence of zinc chloride as the catalyst. This produces a mixture of 74±3% of the p-chloromethyl derivative and 26±3% of the o-chloromethyl derivative, in a yield of 60–65% or 85% of theory (the latter value taking into account the recovered β-chlorethylbenzene). If desired, the two isomers may be separated by known methods, in order to obtain the pure o- or p-isomer of the vinyl-benzyl-oxetane ether in the subsequent etherification with the particular oxetane carbinol, with simultaneous dehydrochlorination.

Further, the chloromethylated β-chlorethylbenzene (isomer mixture) may be first dehydrochlorinated in the temperature range of 420–700° C. and at a pressure of 0.2 atms., and the resulting chloromethylstyrene subsequently etherified.

Finally, the isomeric chloromethylstyrenes may also be produced analogously to a method described in U.S. specification No. 2,981,758, by chlorinating vinyltoluene in the form of the isomer mixture (of 60% m- and 40% p-compound) in the gas phase at about 560° C. using elementary chlorine in the presence of superheated steam, optionally also with addition of an inert gas, whereby chloromethylstyrene is obtained in 99% purity, with the same isomer ratio as the halogen-free product, with a yield of 88–90% of theory and with 23% conversion.

The monomeric compounds of Formula Ib may be polymerised in solution or in emulsion, generally in the presence of catalysts which produce free radicals, by themselves, with another compound corresponding to Formula Ib, or with other polymerisable compounds, to give essentially linear polymers. Depending on the choice of the starting substances one thereby obtains linear polymer homologues (=homopolymers), unipolymers or linear multipolymers (=interpolymers). Polymer homologues are obtained when exclusively identical monomer units are used, unipolymers are obtained when two or more monomer units are used which all correspond to the general Formula Ia, and multipolymers are obtained when using at least one monomer unit of general Formula Ia and at least one other polymerisable monomer unit, cf. "Die Makromolekulare Chemie" 38 (1960), p. 2. Suitable monomeric compounds which may be used for the production of multipolymers are (a) vinyl esters of organic acids, for example vinyl acetate, vinyl formate, vinyl butyrate or vinyl benzoate; (b) vinyl alkyl ketones such as vinylmethylketone; (c) vinyl halides such as vinyl chloride, vinylidene chloride or vinyl fluoride; (d) vinyl aryl compounds such as styrene and substituted styrenes, such as α-methylstyrene; (e) α,β-unsaturated carboxylic acids, such as acrylic acid, methacrylic acid, crotonic acid, maleic acid, fumaric acid and their salts, such as Ca acrylate; (f) derivatives of the acrylic acid series, such as acrylonitrile or acrylamide or methacrylamide, and the N-monosubstituted or N,N-disubstituted derivatives such as N,N-dihydroxyethylacrylamide, N,N-diethylacrylamide, N-tert.butylacrylamide and N-cyclohexylacrylamide; further, N-methylolacrylamide or N-methylolmethacrylamide as well as the corresponding alkyl ethers. Additionally, basic amides, such as diethylaminopropylacrylamide and its quaternisation products are suitable; (g) esters of the acrylic acid series, such as esters of acrylic acid, methacrylic acid, α-chloracrylic acid, crotonic acid, maleic acid, fumaric acid or itaconic acid and monoalcohols or dialcohols having 1 to 18 carbon atoms or phenols, for example ethyl acrylate, glycidyl acrylate, butyl acrylate, the monoglycol ester of acrylic acid, or dodecyl acrylate, and dialkyl maleates. Additionally, polymerisable olefines such as isobutylene, butadiene, isoprene or 2-chlorobutadiene may be used, as well as vinyl alkyl ethers, tetrafluorethylene, acrolein or heterocyclic compounds having a vinyl group, such as vinylpyrrolidone.

Preferably, acrylic acid, methacrylic acid, maleic acid, maleic anhydride, fumaric acid and itaconic acid as well as the salts and esters of these acids such as ethyl acrylate, butyl acrylate, diethyl maleate and vinyl alkyl ethers, such as vinyl n-butyl ether, are used. The polymerisation is preferably carried out in the presence of radical catalysts.

Suitable radical catalysts are for example α,α'-azoisobutyrodinitrile and organic peroxides or per-salts, for example acetyl peroxide, benzoyl peroxide, lauroyl peroxide, cumene hydroperoxide, tert. butyl hydroperoxide, paramenthane hydroperoxide or hydrogen peroxide.

In certain cases the polymerisation may also be effected by heat and/or actinic radiation alone, without the addition of catalysts. The reaction speed of the polymerisation may be modified by the addition of so-called modifiers, like for example mercaptanes or terpenes.

Where peroxidic catalysts are used it is of advantage additionally to use oxidisable compounds, for example ascorbic acid, oxidisable sulphur compounds like for example mercaptans, sodium bisulphite, sodium hydrosulphite or sodium thiosulphate as activators. The simultaneous use of such activators and of the peroxidic polymerisation catalysts results in so-called redox systems, which have a favourable effect on the course of the polymerisation.

Further, the action of the polymerisation catalysts may be accelerated by the conjoint use of a heavy metal compound which can exist in more than one valency state and which is present in the reduced state, like for example ferrous ions. The polymerisation is preferably carried out in the absence of air or oxygen and in the presence of inert gases such as nitrogen.

The polymerisation may be carried out at normal temperature. It is however more advantageous to polymerise at elevated temperature. Temperatures of 40 to 95° C. are for example suitable and especially those of 55 to 90° C.

If the polymerisation is carried out in emulsion the monomeric compounds are preferably emulsified with the aid of emulsifiers. Possible emulsifiers are those of anionic, cationic or non-ionic character.

By way of example there may be mentioned sulphate esters of higher fatty alcohols such as lauryl sulphate; salts of higher fatty amines and acids such as octadecylamine acetate; ethylene oxide condensation products of higher molecular fatty acids, fatty amines, or fatty alcohols such as oleyl alcohol or octadecyl alcohol.

It is also possible to use mixtures of such emulsifiers with protective colloids, such as polyvinyl alcohol, starch, dextrin, methylcellulose, and water-soluble polymers or copolymers of ethylene oxide or propylene oxide, or to use such protective colloids by themselves.

If the polymerisation is carried out in solution it is possible to use solvents in which only the monomeric compounds are soluble, or it is possible to use such solvents in which both the monomers and polymers are soluble. Suitable organic solvents are, for example, butanol, acetone, benzene, toluene or dichlorethane. The polymerisation is appropriately carried out with warming, preferably to the boiling point of the solvent and with the addition of peroxidic catalysts which are soluble in the reaction medium.

If desired, the polymerisation of the monomeric compounds may also be carried out in the presence of substrates. The polymerisation may for example be carried out on glass fibre fabrics or textile materials. In that case, the particular substrate is preferably impregnated with solutions or emulsions of the monomers and the polymerisation is thereafter carried out with addition of a polymerisation catalyst, by heating the material.

The polymers of the invention generally consist of 5 to 100% of a compound of general Formula Ib and of 95 to 0% of another compound. Depending on the choice of polymerisation conditions the polymers are obtained in the liquid form, as a gel, as an emulsion or as granules.

The new polymers may, in the form of their solutions or emulsions, be directly used for the production of coatings on non-porous substances such as metal, glass or wood, for the production of binders, especially for pigments, or for the production of impregnations or coatings on porous substances such as textiles, paper or leather.

Generally, however, modifying substances such as plasticisers, for example dibutyl phthalate, organic or inorganic pigments and fillers, for example glass fibres, mica, quartz flour, cellulose, kaolin, finely divided silica (Aerosil) or metal powder or, especially, harder catalysts and/or cross-linking reagents are still added before use.

As a result of the presence of reactive oxetane groups the new polymers may be cured to give insoluble and infusible products by means of compounds which either cause the oxethane groups to polymerise as such or form cross-linked polyadducts with these.

In this, the polymerisation of the oxetane groups preferably takes place by a cationic reaction mechanism. Thus, it is initiated by cationically acting initiators, such as especially Lewis acids. As such there may be mentioned here, by way of example: Friedel-Crafts catalysts, for example $AlCl_3$, $SbCl_5$, $SbF_5$, $SnCl_4$, $FeCl_3$, $ZnCl_3$, $BF_3$ and their complexes with organic compounds; metal borofluorides such as zinc borofluoride; $PF_5$; phosphoric acid, and salts which react acid such as zinc nitrate, diammonium phosphate or ammonium silicofluoride.

On the other hand compounds are also extensively used for the curing of the polymers of the invention, which have two or more functional groups capable of reacting with the oxetane groups, such as carboxyl groups or carboxylic acid anhydride groups.

As such polyfunctional cross-linking reagents there may be named, by way of example: polybasic carboxylic acids and their anhydrides, for example phthalic anhydride, methyl endomethylene tetrahydrophthalic anhydride, hexahydrophthalic anhydride, methyl hexahydrophthalic anhydride, dodecenyl succinic anhydride, hexachloro-endomethylene tetrahydrophthalic anhydride, maleic anhydride or succinic anhydride or their mixtures, optionally together with accelerators such as tertiary amines or strong acids such as p-toluenesulphonic acid.

Those copolymers of the invention which contain copolymerised unsaturated carboxylic acids, such as acrylic acid, maleic acid, its anhydride, or fumaric acid, may, because of the free carboxyl or anhydride groups, be cured by simple heating without the addition of special curing catalysts or cross-linking agents, that is to say they possess self-curing properties. The term "curing" which is used here denotes the conversion of the present essentially linear polymers containing oxetane groups to cross-linked, insoluble or infusible products.

A special advantage of both the hot-curing mixtures of the new polymers and suitable cross-linking agents, such as for example carboxylic acid anhydrides, and of the copolymers which self-cure on heating and which contain both oxetane groups and free carboxyl or carboxylic acid anhydride groups as structural units, is, according to the invention, their practically unlimited stability at room temperature. This makes it possible to manufacture storage-stable and heat-stable single component systems for a great variety of technical applications.

The homopolymers and copolymers which may be obtained according to the invention may generally be used everywhere where curable condensation resins and/or polymerisation resins are used. They may, by themselves or together with curing catalysts and/or cross-linking agents, and also together with other curable condensation resins like for example aminoplasts, phenoplasts, epoxy-resins, polyacetals of polyalcohols and aldehydes, in the filled or unfilled state, and in solution or emulsion, serve as textile aids, as binders for pigment dyeing and printing on textiles, as coating materials for textiles, leather and paper, as lacquers, paints, dipping resins, casting resins, spreading, filling and trowelling compositions, adhesives and the like, and/or serve for the production of such materials. In the examples which follow the percentages denote percentages by weight.

The monomeric oxetane ethers described below were used for the manufacture of the polymers of the invention, described in the examples.

Oxetane ether A

A round flask of 1.5 litres capacity equipped with a low temperature thermometer dipping into the liquid, with a stirrer and with a drying tube filled with calcium chloride, is charged with 232.3 g. (2 mols) 3-hydroxymethyl-3-ethyl-1-oxacyclobutane and 1032 g. (12 mols) of pure vinyl acetate in which 0.02–0.05% of Cu-naphthenate has been dissolved as a polymerisation inhibitor. After pre-cooling the reaction mixture to −30 to −35° C., 3.6 g. of mercury acetate and 0.4 g. of concentrated sulphuric acid are added as the catalyst, and the temperature of the reaction mixture is kept at −34 to −36° C., preferably using a cooling brine unit with circulating pump, with a bath temperature of −70 to −75° C. The progress of the reaction is continuously followed by taking samples of 1 ml. each every half hour and titrating the acetic acid formed by means of 0.1 N caustic soda (using phenolphthalein as the indicator). In this 10.6 to 10.8 ml. of NaOH are consumed per 1 ml. of reaction liquid after about 6–8 hours reaction duration, which, recalculated to correspond to the total amount, corresponds to approximately 1.2 equivalents of acetic acid. The contents of the flask are now poured on to a mixture of 110 g. of sodium carbonate, 1 litre of water and 4 kg. of ice in a large separating funnel, and the mixture is vigorously shaken several times and allowed to stand overnight. The next day the organic phase is separated off, dried by means of anhydrous sodium sulphate, and distilled, after filtration, through a Vigreux column. In order to avoid losses of vinyl acetate as a result of polymerisation, a small amount of inhibitor (Cu-naphthenate or phenothiazine) is again added to the mixture of vinyl ether and monomeric excess vinyl acetate before distillation. At normal pressure one initially obtains a first run of 820–850 g. of boiling point (750 torr)=70–73° C., which consists of monomeric vinyl acetate which is again available for further charges. Thereafter one obtains, on applying a water pump vacuum, approximately 116–118 g. of a fraction of boiling point (7–8 torr)=59–63° C. and $n_D^{20}=1.4482$. The latter consists of the vinyl ether, which is again rectified in order to purify it further. Thereupon one obtains, after a very small first run, about 114–115 g. of pure oxetane ether A of formula

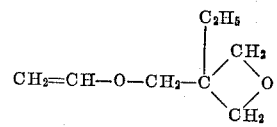

of boiling point (8 torr)=62–63° C. and $n_D^{20}=1.4488$–1.4490, corresponding to a yield of about 40% of theory. The ether is a colourless liquid of low viscosity having a pleasant odour reminiscent of terpene ketone, and hydroxyl bands can no longer be detected in the infra red spectrum. This also accords with the gas chromatography analysis, which does not even show traces of oxetane alcohol. The figures of elementary analysis, oxetane equivalent (determined by HBr titration in glacial acetic acid) and double bond number (determined by catalytic hydrogenation) also accord with the theoretically calculated values.

In accordance with the general behaviour of vinyl ethers, the oxetane ether A obtained is relatively difficult to homopolymerise but very easily forms copolymers with suitable monomers such as for example maleic anhydride or acrylic esters. As a result, the ether has very good storage stability so that the addition of a polymerisation inhibitor is unnecessary.

Homologous oxetane ethers may be obtained if in the process described above an equivalent amount of 3-hydroxymethyl-3-methyl-1-oxacyclobutane or 3-hydroxymethyl-2,3-dimethyl-1-oxacyclobutane is used instead of the 3-hydroxymethyl-3-ethyl-1-oxacyclobutane.

Oxetane ether B

A three litre four-necked flask equipped with reflux condenser, dropping funnel, thermometer dipping into the liquid and stirrer, is first charged with 1400 g. (corresponding to 12.05 mols) of 3-hydroxymethyl-3-ethyl-1-oxacyclobutane, and 550 g. of finely powdered 90% potassium hydroxide (corresponding to 8.8 mols) are dissolved therein at about 90–100° C. with vigorous stirring. Thereafter 756.4 g. (corresponding to 4 mols) of chloromethyl-β-chlorethyl-benzene (mixture of o- and p-isomers) is added dropwise over the course of half to three quarters of an hour, during which the temperature of the reaction mixture mounts to 120–125° C. When addition of the dichloro-compound is complete, the mixture is finally stirred for a further 4 hours at 100–105° C. internal temperature, is then cooled to about 10° C., and the potassium chloride which has separated out is filtered off, washed with ether and dried in vacuo. 588 g. of the potassium salt are obtained, corresponding to a yield of 98.5% of theory (corresponding to 8 mols). The residue remaining on evaporation of the ether is added to the filtrate and the latter taken up in approximately 3–4 litres of petrol ether (boiling range 30–50° C.). The petrol ether solution is then washed several times with distilled water in order to remove the oxetane carbinol which was employed in excess, with the first wash water containing an amount of hydrochloric acid equivalent to the neutralisation of the excess caustic potash employed (10% excess). The oxetane alcohol dissolved in the aqueous phase may be recovered therefrom by distillation and is then again available for further charges. The solvent is removed from the petrol ether layer after drying over anhydrous sodium or magnesium sulphate, using a rotating evaporator at a bath temperature of 20–30° C., and the crude oxetane ether which remains is distilled in a high vacuum (1 to 10⁻³ torr) with the addition of 0.5 to, at most, 1% tert. butylpyrocatechol as inhibitor in a thin film distillation column (brush column) with the crude ether being added dropwise as quickly as possible. One thus obtains, from 840 g. of crude product, 740–750 g. of oxetane ether B of formula

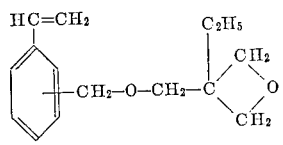

(mixture of the ortho- and para-isomers) corresponding to a yield of 79–82% of theory, relative to the chloromethyl-β-chlorethylbenzene employed. The unsaturated ether is a colourless liquid of moderate viscosity at room temperature, having a pleasant odour faintly reminiscent of styrene. The boiling point of the ether (as an isomer mixture of the o- and p-compounds) is between 110 and 120° C. at a pressure of 0.03 torr; $n_D^{20}=1.5341$.

90–100 g. of a dark brown viscous oil remain as a residue. Since it is unavoidable that because of the relatively high boiling point of the oxetane ether the inhibitor simultaneously passes over, at least in part, the distillate is, where it is intended to use it immediately for polymerisation purposes, taken up in as little petrol ether (in which the monomer easily dissolves) as possible immediately after the completion of distillation, and the petrol ether solution is extracted with dilute (5–10% strength) caustic soda until the red colouration of the alkaline extracts completely disappears. Thereafter the organic phase is washed with water until neutral, which at the same time removes residual amounts of oxetane carbinol which may possibly still be present, having remained in the oxetane ether during the first extraction of the crude ether with water. Finally, after again drying the solution of the monomer, the petrol ether is removed in vacuo, again using a rotating evaporator, and residual amounts of solvent are expelled by applying a high vacuum until constant weight is reached. The infra red spectrum of the pure ether should no longer show any recognisable hydroxyl bands, even though small amounts of the alcohol do not interfere with the polymerisation of the oxetane ether.

Analogously to the oxetane methylene ethers described above which have an ethyl group in the 3-position of the trimethylene oxide ring, the corresponding 3-methyloxetane-methylene ether of hydroxymethylstyrene is obtained using 3-hydroxymethyl-3-methyl-1-oxacyclobutane, and the properties of this ether largely match those of the oxetane ether B described above.

Similarly, one obtains on reaction of 3-hydroxymethyl-2,3-dimethyl-1-oxacyclobutane (obtainable by cyclisation of 2 - methyl - 2 - (α - hydroxyethyl) - propanediol - 1,3) with chloromethylated β-chloroethylbenzene, with simultaneously occurring dehydrochlorination, a vinyl-benzyloxetane-methylene ether which has a methyl group in both the 2-position and the 3-position of the oxetane ring.

EXAMPLE 1

50 g. (0.352 mol) of oxetane ether A (=[(3-ethyl-1-oxacyclobutyl-3)-methyl]-vinyl ether) and 34.5 g. (0.352 mol) of maleic anhydride are disolved in 900 ml. of dry benzene with stirring, and after adding 0.42 g. of benzoyl peroxide as the initiator (corresponding to 0.5%, relative to the total weight of the monomer) the mixture is kept for 20 hours at 60° C. bath temperature with oxygen-free nitrogen slowly bubbling through it. In the course of this the copolymer, which is of low solubility in benzene, gradually separates out in a finely granular, easily filtrable, form. After cooling, the copolymer is filtered off, washed with low boiling petrol ether and dried in vacuo. One thus obtains 70 g. of a snow-white powder of softening point 230–232° C. corresponding to 83% conversion. Determination of the anhydride groups of the copolymer gives 50.1 mol percent content of copolymerised maleic anhydride, whereas titration of the oxetane group also gives a value which accords with the theoretical value of 50 mol percent of copolymerised oxetane ether. The yellowish coloured melt produced on warming the copolymer proved insoluble in all the usual organic solvents. Similarly, the solution of the copolymer in ketones such as for example methyl ethyl ketone or cyclohexanone on evaporation of the solvent leaves a clear slightly yellowish coloured insoluble lacquer film.

90% conversion to a copolymer having an anhydride group content corresponding to 55 mol percent and a softening point of 230 to 235° C. is obtained by 79 hours polymerisation at a temperature of 80° C., otherwise working as above.

EXAMPLE 2

50 g. (0.352 mol) of oxetane ether A are dissolved in 240 ml. of dry acetone with simultaneous addition of 34.5 g. (0.352 mol) of maleic anhydride, and after adding 0.42 g. (corresponding to 0.5% relative to the total weight of monomer) of benzoyl peroxide as the initiator, the mixture is kept for 5 hours at 60° C. bath temperature, under reflux, with oxygen-free nitrogen bubbling through it. After cooling, the mixture is stirred into water using a vibro-mixer, and the white powder which thereupon separates out in a fine form is filtered off. After drying in vacuo, 35 g. of copolymer of softening point 200° C. are obtained; its anhydride values and oxetane values indicate a 1:1 molar ratio of copolymerised maleic anhydride to copolymerised oxetane ether.

EXAMPLE 3

25.0 g. (0.25 mol) of vinyl n-butyl ether, 35.5 g. (0.25 mol) of oxetane ether A, 43.0 g. (0.25 mol) of diethyl maleate and 24.5 g. (0.25 mol) of maleic anhydride are disolved in 1.25 litres of benzene with stirring, and after addition of 0.65 g. (0.5%) of benzoyl peroxide are polymerised for 47 hours at 80° C. with nitrogen slowly being passed though. After cooling, filtering off, washing with low boiling petrol ether and drying in vacuo, 49 g. of a white powder of softening point 180° C. are obtained, corresponding to a conversion of 38%. The copolymer is easily soluble in ethyl acetate, acetone and dimethylformamide but is insoluble in chloroform and isobutanol. Analysis of the anhydride groups and oxetane groups, as well as the saponification number, agree well with the assumption of a quaterpolymer of 25 mol % vinyl butyl ether, 25 mol % of oxetane ether A, 25 mol % maleic ester and 25 mol % maleic anhydride.

EXAMPLE 4

20 g. of oxetane ether A, 10 g. of n-butyl acrylate, 10 g. of methyl methacrylate and 1 g. of dibenzoyl peroxide are mixed and slowly added dropwise with stirring, at 135° C., to 40 g. of xylene. The addition extends over 1 hour. The mixture is then further polymerised for 7 hours at 140° C. The copolymer solids content of the reaction solution is now 34%.

After adding 1 g. of dibenzoyl peroxide the mixture is polymerised for a further 3 hours, with the copolymer solids content rising to 35.6%.

30 g. of solution from the reaction mixture are evaporated in a high vacuum at 150° C. Thereupon, 10.85 g. of a highly viscous yellowish resin having an oxetane number of 1.78 equivalent oxetane groups/kg. (theoretical value 3.43) are obtained.

EXAMPLE 5

15 g. of oxetane ether B (mixture of the ortho- and para-isomers) having an oxetane number of 4.2 equivalent oxetane groups per kg. (theoretical value 4.3) are dissolved in 40 g. of toluene, treated with 0.6 g. of α,α'-azo-bis-isobutyronitrile, and polymerised for 22 hours with stirring at 75–77° C., under a stream of nitrogen. A homopolymer dissolved in toluene is obtained, which on evaporating the toluene on a glass plate leaves a film which is slightly sticky. The oxetane number of this toluene solution of the homopolymer is 1.2 equivalent oxetane groups/kg. (theoretical value 1.13 equivalent oxetane group/kg.). Evaporation of the solvent over the course of 1 hour at 98° C. under a water pump vacuum gives a homopolymer solids content of 28.0% (theoretical value 27.3%).

The oxetane number of the vacuum-dried homopolymer (determined by titration with HBr dissolved in pure glacial acetic acid, using monochlorobenzene/glacial acetic acid (approx. 2:1) as the solvent and crystal violet as the indicator) is 4.52 equivalent oxetane groups/kg.

EXAMPLE 6

15.0 g. of oxetane ether B (oxetane number=4.2 equivalent oxetane groups/kg.), 20.0 g. of n-butyl acrylate, 4.65 g. of acrylic acid, 30.0 g. of toluene and 10.0 g. of n-butanol are mixed and 1.5 g. of dicyclohexyl peroxide (50% strength solution in dimethyl phthalate) and 0.3 g. of dodecyl mercaptan are then added with good stirring. The mixture is then polymerised for 12 hours at 68–70° C. under a stream of nitrogen, whereupon a highly viscous copolymer is obtained which is dissolved in a further 107 g. of n-butanol.

The oxetane number of this copolymer solution, having a copolymer solids content of 15.85% (theoretical value 21.9%) is 0.37 equivalent oxetane groups/kg. (theoretical value 0.33 equivalent oxetane groups/kg.).

Though the copolymer contains free carboxyl groups, its solution has good stability at room temperature. This emerges from a determination of the acid number and the oxetane value of the copolymer solution after 7 days standing, after which the characteristics quoted still show the initial value (acid number=18.7; oxetane number=0.37 equivalent oxetane groups/kg.).

The solid copolymer, which has an acid number of 95 (theoretical value=87.5) and an oxetane number of 1.93 equivalent oxetane groups/kg. (theoretical value= 1.52 equivalent oxetane groups/kg.) is obtained by evaporating the solvent in vacuo.

EXAMPLE 7

25 g. of the homopolymer solution described in Example 5 (28% strength) are mixed with 10.65 g. of a reaction product of 1 mol of maleic anhydride and 2 mols of ricinoleic acid (of acid number 156) and poured on to an aluminum sheet. The mixture is then stoved for 1½ hours at 180° C., and a highly glossy yellowish coloured coating is obtained which is scratch resistant and shows very good adhesion. The Erichsen cupping value is 10 mm. The film is insoluble in acetone.

The above stoving mixture is, despite its high acid number, stable at room temperature for a prolonged period of time, so that its processing is unaffected by premature gelling.

EXAMPLE 8

The copolymer solution (15.85% strength) described in Example 6, which shows good storage stability at room temperature, is poured on to an aluminum sheet and stoved for 2 hours at 180° C.; a colourless glossy coating is obtained which is scratch resistant and shows good adhesion. The Erichsen cupping value is 10.0 mm. The film is insoluble in acetone.

EXAMPLE 9

20 g. of the copolymer solution (15.85% strength) described in Example 6 are mixed with 1.3 g. of a poly-(methoxymethyl)melamine, poured on to an aluminum sheet, and stoved for 2 hours at 180° C. A colourless highly glossy coating results, which is scratch resistant and shows excellent adhesion. The Erichsen cupping value is 10.0 mm. The film is insoluble in acetone. The above stoving lacquer mixture shows good storage stability at room temperature.

EXAMPLE 10

80 g. of n-butyl acrylate, 10 g. of acrylonitrile and 10 g. of oxetane ether B are pre-emulsified in a solution of 2 g. of sodium laurylsulphonate and 1 g. of disodium phosphate in 130 g. of water. Half of this pre-emulsion is warmed to 60° C. with stirring and with nitrogen being passed in, and is treated with a solution of 0.25 g. potassium persulphate in 5 g. of water and a solution of 0.1 g. of sodium metabisulphite in 5 g. of water. After starting the polymerisation, the residual pre-emulsion is treated with a solution of 0.25 g. of potassium persulphate in 5 g. of water and introduced into the polymerisation vessel over the course of 60 minutes. 30 minutes after addition is complete, a solution of 0.1 g. of sodium metabisulphite in 5 g. of water is added and the mixture allowed to post-polymerise for 3 hours. The product is flushed with nitrogen for 10 minutes, cooled, and filtered; about 248 g. of an emulsion having a pH value of 7.1 and a solids content of 41.4%, corresponding to a polymer yield of 99.2%, are obtained.

EXAMPLE 11

77 g. of n-butyl acrylate, 7 g. of acrylonitrile, 6 g. of 2-hydroxyethyl methacrylate and 10 g. of oxetane ether B are polymerised by the method described in Example 10, with the difference that the polymerisation is started by an additional 0.05 g. of ferrous sulphate.

EXAMPLE 12

77 g. of n-butyl acrylate, 10 g. of acrylonitrile, 3 g. of 2-hydroxypropyl methacrylate and 10 g. of oxetane ether B are polymerised by means of an additional 0.05 g. of ferrous sulphate, according to the process described in Example 10.

EXAMPLE 13

The emulsion polymers produced in Examples 10, 11 and 12 are diluted with water to a solids content of 40%. 5 g. of each of these emulsions are mixed with 0.04 g. each (=2%, relative to solids content) of (a) 36% strength hydrochloric acid
(b) trichloracetic acid
(c) ammonium chloride
(d) zinc borofluoride dissolved in 2 g. of water each.

and the mixtures are cast into films on glass plates, dried in air, and cured for 7 minutes at 130° C. The films, which adhere very firmly, are completely insoluble in methyl ether ketone.

EXAMPLE 14

84 g. of n-butyl acrylate, 3 g. of acrylic acid, 3 g. of 2-hydroxyethyl methacrylate and 10 g. of oxetane ether B are pre-emulsified in a solution of 2 g. of sodium laurylsulphonate in 130 g. of water. Half this pre-emulsion is warmed to 40° C. and treated with a solution of 0.25 g. of potassium persulphate in 5 g. of water and a solution of 0.1 g. of sodium metabisulphite in 5 g. of water. After starting the polymerisation by means of 0.05 g. of ferrous sulphate, the residual pre-emulsion is treated with a solution of 0.25 g. of potassium persulphate in 5 g. of water and introduced into the polymerisation vessel over the course of 60 minutes. 30 minutes after the completion of addition, a solution of 0.1 g. of sodium metabisulphite in 5 g. of water are added and the mixture allowed to post-polymerise for 3 hours. It is then cooled, and on filtration about 250 g. of an emulsion which has a pH value of 2.8 and a solids content of 40%, corresponding to a polymer yield of 97%, are obtained.

The emulsion is free of coagulate after storing for 8 days at 50° C. 5 g. of the resulting emulsion are cast into a film on a glass plate, dried, and cured for 7 minutes at 130° C. The clear film, which adheres very firmly, is completely insoluble in methyl ethyl ketone.

EXAMPLE 15

70 g. of styrene, 20 g. of n-butyl acrylate and 10 g. of oxetane ether B are dissolved in 55 g. of 1,2-dichlorethane and 2.5 g. of isopropanol. A third of this solution is warmed to 85° C. with stirring and treated with a solution of 0.7 g. of azodiisobutyronitrile in 5 g. of 1,2-dichlorethane. 30 minutes later the residual monomer solution is treated with a solution of 0.8 g. of azodiisobutyronitrile and is introduced into the polymerisation vessel over the course of 6 hours. 30 minutes after addition is complete a solution of 0.5 g. of azodiisobutyronitrile is added and the mixture allowed to complete polymerisation over the course of 10 hours. About 162 g. of a viscous solution are obtained which has a solids content of 60% corresponding to a polymer yield of 97%.

3.3 g. of the solution are mixed with a solution of 0.08 g. of boron trifluoride/ethyl etherate in 2 g. of 1,2-dichloroethane. The mixture is treated with traces of water and cast on a glass plate. The film obtained on drying and warming to 100° C. for 5 minutes is completely insoluble in benzene.

EXAMPLE 16

70 g. of styrene, 14.4 g. of n-butyl acrylate, 5.6 g. of 2-hydroxyethyl methacrylate and 10 g. of oxetane ether B are polymerised by the process described in Example 15.

3.3 g. of the solution are mixed with a solution of 0.04 g. of dioctadecyl dimethylammonium chloride in 2 g. of 1,2-dichloroethane. The mixture is cast on a glass and cured for 7 minutes at 170° C. The firmly adhering film is insoluble in benzene.

What is claimed is:

1. An essentially linear polymer which contains, arranged along the polymer chain, units of structural formula

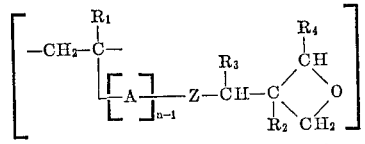

in which $R_1$ represents a member selected from the group consisting of hydrogen atom and lower alkyl group of 1 to 4 carbon atoms, $R_2$ represents a lower alkyl group of 1 to 4 carbon atoms, $R_3$ and $R_4$ each represent members selected from the group consisting of hydrogen atom and the methyl group, Z is a member selected from the group consisting of oxygen atom and sulphur atom, A is a member selected from the group consisting of bivalent aliphatic, cycloaliphatic, araliphatic and aromatic hydrocarbon residue and $n$ represents a whole number of at least 1 and at the most 2.

2. A polymer according to claim 1, containing, arranged along the polymer chain, units of structural formula

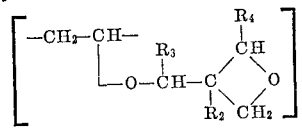

in which the residues $R_2$, $R_3$ and $R_4$ have the same significance as in claim 1.

3. A polymer according to claim 2 containing, arranged along the polymer chain, units of structural formula

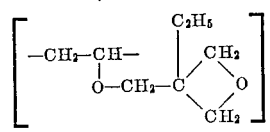

4. A polymer according to claim 1 containing, arranged along the polymer chain, units of structural formula

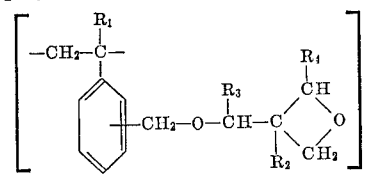

in which the residues $R_1$ to $R_4$ have the same significance as in claim 1.

5. A polymer according to claim 4 containing, arranged along the polymer chain, units of structural formula

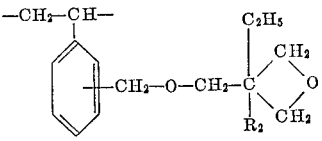

6. A copolymer according to claim 1, which additionally contains, arranged along the polymer chain, units selected from the group consisting of units of formula

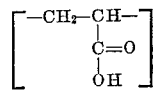

units of formula

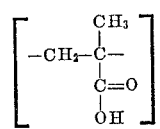

and units of formula

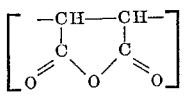

7. A copolymer according to claim 1 which additionally contains, arranged along the polymer chain, units selected from the group consisting of units of formula

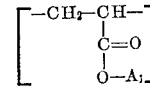

and units of formula

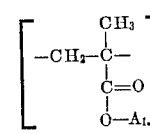

in which $A_1$ is an alkyl group.

8. An ethylenically unsaturated polymerizable monomer containing oxetane groups, of formula

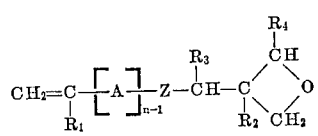

in which $R_1$ represents a member selected from the group consisting of hydrogen atom and lower alkyl group of 1 to 4 carbon atoms, $R_2$ represents a lower alkyl group of 1 to 4 carbon atoms, $R_3$ and $R_4$ each represent a member selected from the group consisting of hydrogen atom and the methyl group, Z is selected from the group consisting of oxygen atom and sulphur atom, A is a member selected from the group consisting of bivalent aliphatic, cycloaliphatic, araliphatic and aromatic hydrocarbon residue, and $n$ is a whole number of at least 1 and the most 2.

9. A monomer as claimed in claim 8 of formula

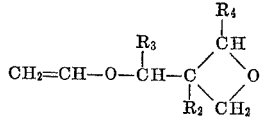

in which the residues $R_2$, $R_3$ and $R_4$ have the same significance as in claim 8.

10. The vinyl ether of formula

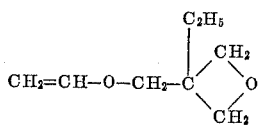

11. A monomer as claimed in claim 8 of formula

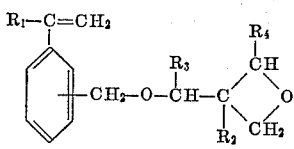

in which the residues $R_1$, $R_2$, $R_3$ and $R_4$ have the same significance as in claim 8.

12. A vinylbenzyl ether of formula

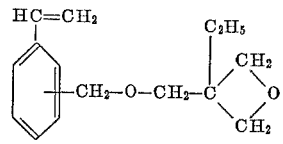

in which the residues $R_1$, $R_2$, $R_3$ and $R_4$ have the same significance as in claim 8.

References Cited

UNITED STATES PATENTS

| | | | |
|---|---|---|---|
| 3,105,838 | 10/1963 | Luskin | 260—333 |
| 3,297,719 | 1/1967 | Berezin | 260—333 |

JOSEPH L. SCHOFER, *Primary Examiner.*

JOHN KIGHT III, *Assistant Examiner.*

U.S. Cl. X.R.

260—80.3, 85.7, 82.1, 86.1, 87.5, 87.7, 88.1, 88.3, 91.1, 333

UNITED STATES PATENT OFFICE
CERTIFICATE OF CORRECTION

Patent No. 3,415,794                         December 10, 1968

Hans Orth et al.

It is certified that error appears in the above identified patent and that said Letters Patent are hereby corrected as shown below:

Column 12, lines 22 to 27, the formula should appear as shown below:

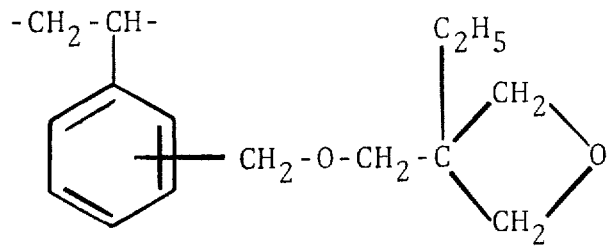

Signed and sealed this 24th day of March 1970.

(SEAL)
Attest:

EDWARD M. FLETCHER, JR.               WILLIAM E. SCHUYLER, JR.
Attesting Officer                         Commissioner of Patents